(12) United States Patent
Druist

(10) Patent No.: US 12,094,501 B1
(45) Date of Patent: Sep. 17, 2024

(54) HARD DISK DRIVE SLIDER SPLIT PAD CONFIGURATION

(71) Applicant: Western Digital Technologies, Inc., San Jose, CA (US)

(72) Inventor: David P. Druist, Meridian, ID (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/225,084

(22) Filed: Jul. 21, 2023

Related U.S. Application Data

(60) Provisional application No. 63/457,358, filed on Apr. 5, 2023.

(51) Int. Cl.
 *G11B 5/48* (2006.01)
 *G11B 5/455* (2006.01)

(52) U.S. Cl.
 CPC ............ *G11B 5/4853* (2013.01); *G11B 5/455* (2013.01)

(58) Field of Classification Search
 None
 See application file for complete search history.

(56) References Cited

U.S. PATENT DOCUMENTS

| | | | |
|---|---|---|---|
| 5,465,186 A | 11/1995 | Bajorek et al. | |
| 5,494,473 A * | 2/1996 | Dupuis | G11B 21/21 |
| 5,528,819 A | 6/1996 | McKay et al. | |
| 5,796,549 A | 8/1998 | Sebrook et al. | |
| 6,091,155 A | 7/2000 | Jonaidi | |
| 6,330,132 B1 | 12/2001 | Honda | |
| 7,002,779 B2 | 2/2006 | Zhu et al. | |
| 7,535,676 B2 | 5/2009 | Lille | |
| 7,554,769 B2 | 6/2009 | Yamakura et al. | |
| 7,619,856 B2 | 11/2009 | Matsumoto et al. | |
| 8,125,734 B2 * | 2/2012 | Umezaki | G11B 5/4853 360/234.5 |

(Continued)

FOREIGN PATENT DOCUMENTS

JP H08203031 A * 8/1996 ........... G11B 5/3196

OTHER PUBLICATIONS

Kamano, Katayut et al., Back Side Pad Bonding of Hard Disk Head Slider, CMU.J.Nat.Sci Special Issue on Manufacturing Technology, 2011, pp. 29-37, vol. 10(1).

(Continued)

*Primary Examiner* — William J Klimowicz
(74) *Attorney, Agent, or Firm* — John D. Henkhaus

(57) ABSTRACT

A hard disk drive head slider housing a read-write transducer includes electrical pads for bonding with a suspension flexure, electrically conductive bonding studs each extending into the slider body from a corresponding bonding pad, electrical pads for testing where each is positioned proximate to and at a distance from a corresponding bonding pad, electrically conductive testing studs each extending into the slider body from a corresponding testing pad, and a conductive layer within the slider body for electrically connecting a bonding pad with a corresponding testing pad via respective bonding and testing studs. This arrangement accomplishes the effects of a commonly-employed anti-wetting overlay separating the testing pad from the bonding pad, without the added cost, capital expenditure, process and yield difficulties associated with the anti-wetting overlay.

20 Claims, 6 Drawing Sheets

(56) References Cited

U.S. PATENT DOCUMENTS

| | | | |
|---|---|---|---|
| 8,164,858 B1* | 4/2012 | Moravec | G11B 5/4853 360/234.5 |
| 8,259,415 B2 | 9/2012 | Hutchinson et al. | |
| 8,279,558 B2 | 10/2012 | Limmer et al. | |
| 8,320,081 B2* | 11/2012 | Chou | G11B 5/4853 360/234.5 |
| 8,351,158 B2 | 1/2013 | Zhu et al. | |
| 8,587,901 B1* | 11/2013 | Puttichaem | G11B 5/486 360/234.5 |
| 8,693,141 B1* | 4/2014 | Elliott | G11B 5/17 360/123.1 |
| 9,361,916 B1 | 6/2016 | Chung et al. | |
| 9,390,737 B1 | 7/2016 | Puttichaem et al. | |
| 9,728,211 B1* | 8/2017 | Murata | G11B 5/4826 |
| 10,460,754 B2 | 10/2019 | Matsumoto et al. | |
| 10,706,880 B1* | 7/2020 | Grimm | G11B 5/4826 |
| 10,964,342 B1 | 3/2021 | Grimm et al. | |
| 11,705,153 B1* | 7/2023 | Naniwa | H05K 3/3452 360/234.5 |
| 2001/0052773 A1* | 12/2001 | Heim | G11B 5/455 324/210 |
| 2003/0206373 A1* | 11/2003 | Kato | G11B 5/6005 29/603.07 |
| 2005/0036238 A1* | 2/2005 | Tabakovic | G11B 5/127 |
| 2006/0044689 A1* | 3/2006 | Lille | G11B 5/3169 |
| 2006/0044702 A1* | 3/2006 | Ding | G11B 5/40 360/323 |
| 2007/0137024 A1 | 6/2007 | Yao et al. | |
| 2009/0086374 A1* | 4/2009 | Smith | G11B 5/4826 360/234.5 |
| 2010/0157477 A1* | 6/2010 | Morinaga | G11B 5/40 360/125.12 |
| 2010/0321829 A1 | 12/2010 | Hutchinson et al. | |
| 2011/0194208 A1 | 8/2011 | Chou et al. | |
| 2013/0063839 A1 | 3/2013 | Matsumoto et al. | |
| 2014/0177406 A1* | 6/2014 | Inoue | G11B 5/3163 369/13.13 |
| 2014/0198411 A1* | 7/2014 | Peng | G11B 5/4826 360/234.5 |
| 2016/0322072 A1 | 11/2016 | Puttichaem et al. | |
| 2018/0108374 A1* | 4/2018 | Klarqvist | G11B 5/4853 |
| 2019/0122694 A1* | 4/2019 | Davidson | G11B 5/3109 |
| 2023/0178105 A1* | 6/2023 | Naka | G11B 5/4853 360/234.5 |

OTHER PUBLICATIONS

Luk, C.F. et al., Development of gold-to-gold interconnection flip chip bonding for chip on suspension assemblies, Microelectronics Reliability 42 (2002) 381-389, Received Sep. 19, 2001 / received in revised form Nov. 5, 2001, Elsevier Science Ltd.

* cited by examiner

HARD DISK DRIVE SLIDER SPLIT PAD CONFIGURATION

FIELD OF EMBODIMENTS

Embodiments of the invention may relate generally to hard disk drives, and particularly to approaches to electrical pads for improving bonding and electrical testing.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") housed in a slider that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic-recording disk, which in turn magnetizes a small area on the recording medium.

To write data to or read data from the recording medium, the head has to receive instructions from a controller. Hence, the head is electrically connected to the controller in some manner such that not only does the head receive instructions to read and write data, but the head can also send information back to the controller regarding the data read and written. Typically, a flexible printed circuit (FPC) mounted on a suspension is used to electrically transmit signals from the head to other electronics within an HDD. At one end, the FPC-suspension assembly and the head are electrically connected together typically with solder at the head slider. To connect these components with solder, the suspension electrical pads and the slider electrical pads are heated, typically using a solder reflow, hot air, or a laser to heat the materials in the bonding procedure.

The electrical pads on a head slider serve two purposes. The first purpose is to create pads that can be connected using solder bonding to the suspension for HDD operation. For this purpose, smaller pads with larger separation are preferred so the resulting solder fillet is not too thin, and the pads do not bridge during soldering. The second purpose is for slider characterization and defect screening during the wafer and slider manufacturing processes. Examples of these testing operations include wafer final probe, slider quasi-static testing, and slider DET (dynamic electrical test) testing. For these testing operations, larger pads are preferred in order to make contact to the gold pads with external probes. These testing operations have become progressively more difficult as the number of pads has increased.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Figure 1:
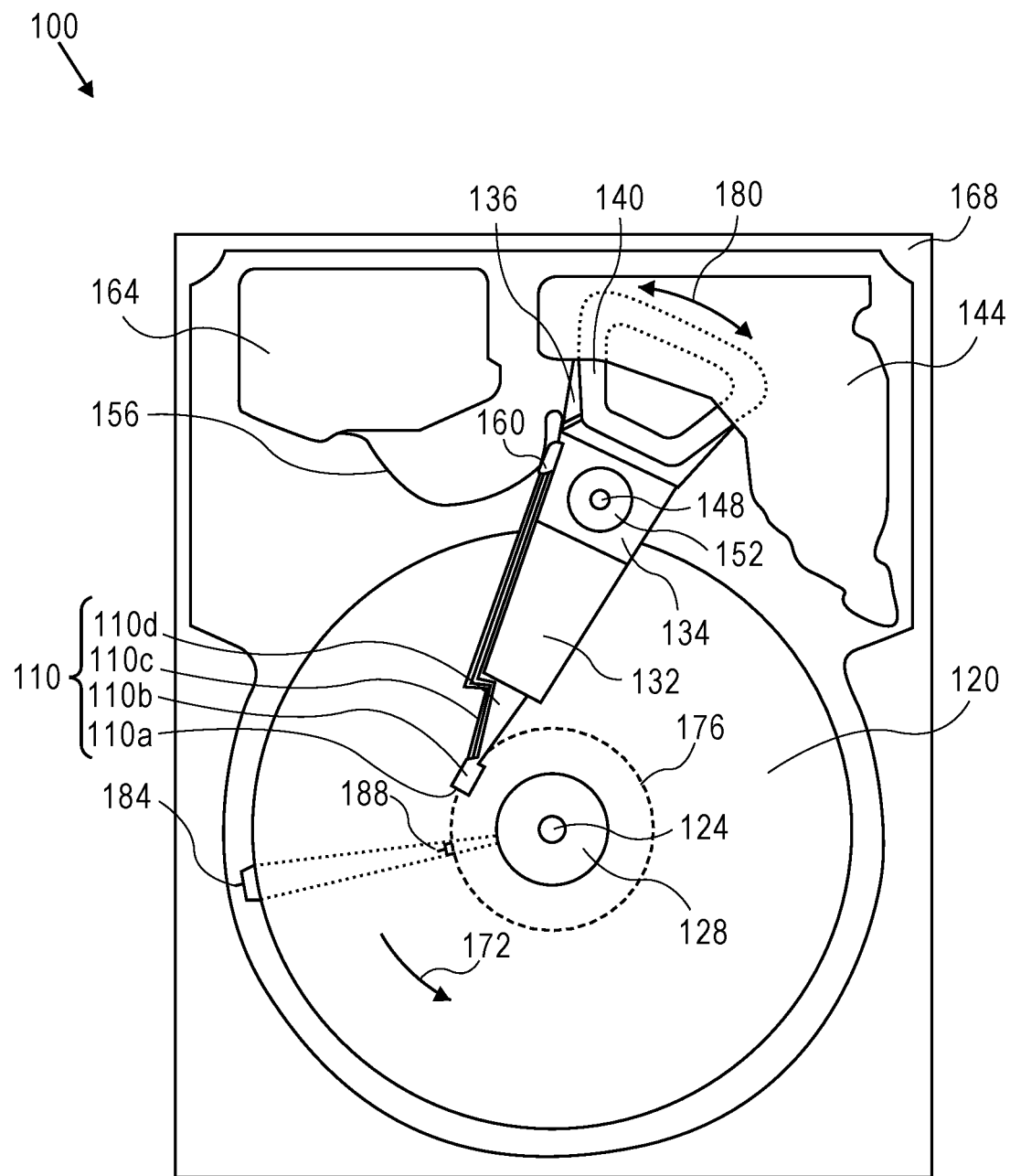
FIG. 1 is a plan view illustrating a hard disk drive, according to an embodiment.

Generally, approaches to improved electrical pads and their connection structure to the underlying head circuitry for bonding and electrical testing purposes are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

Introduction

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall that a flexible printed circuit (FPC) mounted on a suspension is typically used to electrically transmit signals from the read-write head to other electronics within an HDD, and that the FPC-suspension assembly and the head are electrically connected together with solder at the head slider via electrical connection pads (or simply "electrical pads" or "pads") on the respective components. Recall further that the electrical pads on a slider serve two purposes, each with a different optimal design. As such, one purpose is to create pads that can be connected using solder bonding to a suspension for HDD operation, where smaller pads with larger separation are preferred, and the other purpose is for slider characterization and defect screening during the wafer (from which sliders are fabricated) and slider manufacturing processes, where larger pads are preferred in order to make contact to the gold pads with external probes. These testing operations have become progressively more difficult as the number of pads has increased (e.g., greater than eight pads). Thus, a single gold pad is not able to support sufficient yields for all the relevant operations. As a result, a titanium nitride (TiN), titanium (Ti), or other anti-wetting (e.g., relative to solder) layer may be deposited on the gold pads to limit solder flow, while keeping a larger gold pad for probing. Otherwise the solder volume may undesirably overexpand to the entire slider pad. This TiN anti-wetting layer requires additional wafer process operations, increasing wafer cycle time and adding cost. It also requires certain tooling and additional capital expenditure to support the TiN deposition. Some of the testing operations (e.g., row level quasi-static testing, slider DET) also have difficulty in obtaining valid measurements if the probes touch the TiN, leading to yield loss and/or the need for re-probing to ensure sufficient probe yields. An additional challenge is that the TiN film is brittle and can easily be damaged in the slider fab process, leading to additional slider fab yield loss.

Figure 2A:
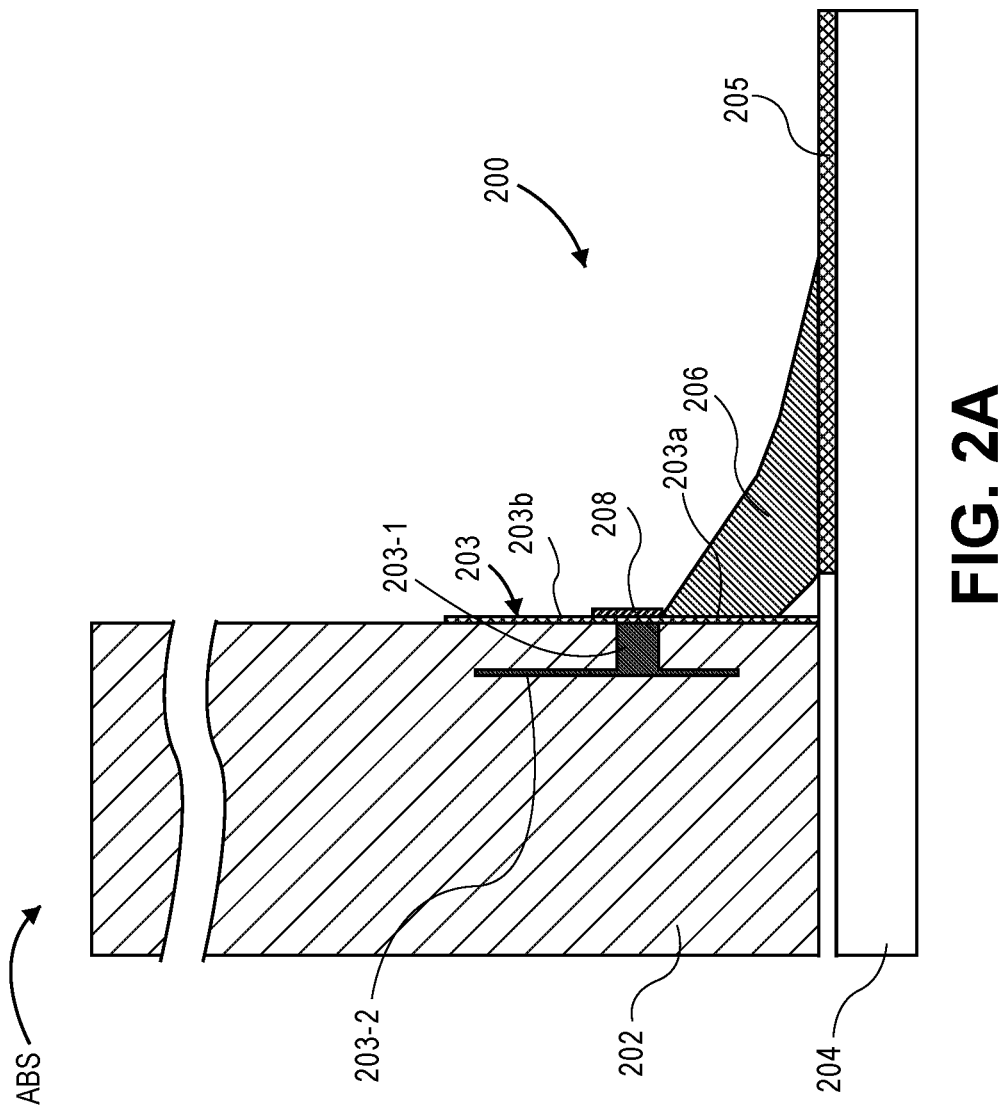
FIG. 2A is a side view illustrating a slider-flexure electrical connection including an anti-wetting layer.

FIG. 2A is a side view illustrating a slider-flexure electrical connection including an anti-wetting layer. Unitary pad configuration 200 comprises a head slider 202 electrically connected to a flexure 204 by way of an electrical interconnection, i.e., a solder fillet 206, between a unitary slider electrical pad 203 (or simply "slider pad") coupled with the slider 202 and a flexure electrical pad 205 (or simply "flexure pad" or "suspension pad") coupled to the flexure 204. Corresponding to the unitary slider pad 203, slider 202 further comprises an electrically conductive (e.g., copper) stud 203-1, extending into the body of slider 202 and electrically coupling the slider pad 203 with a conductive layer 203-2 recessed within the body of slider 202. According to the concept discussed elsewhere herein, the unitary slider pad 203 is effectively utilized as two "functional" or "operational" or "virtual" pads or portions, i.e., a bonding pad 203a and a testing pad 203b. However, it may be the case that during the slider-flexure interconnection process, a significant amount of the solder flows to the wider testing pad 203b portion, i.e., on to the slider side of the pads 203. Or it may be the case that too little solder flows to the narrower bonding pad 203a portion, i.e., on the suspension side of the pads 203, and thereby may cause an open connection between the head slider 202 and the corresponding lead suspension of which flexure 204 is part, and thus result in an open or incomplete circuit. Consequently, here the bonding pad 203a and the testing pad 203b are separated by a TiN anti-wetting layer 208. As discussed, the TiN anti-wetting layer 208 is employed as a dam or barrier to limit the flow of the solder fillet 206 so that the solder material is prohibited/inhibited from flowing onto or over the testing pad 203b.

Figure 2B:
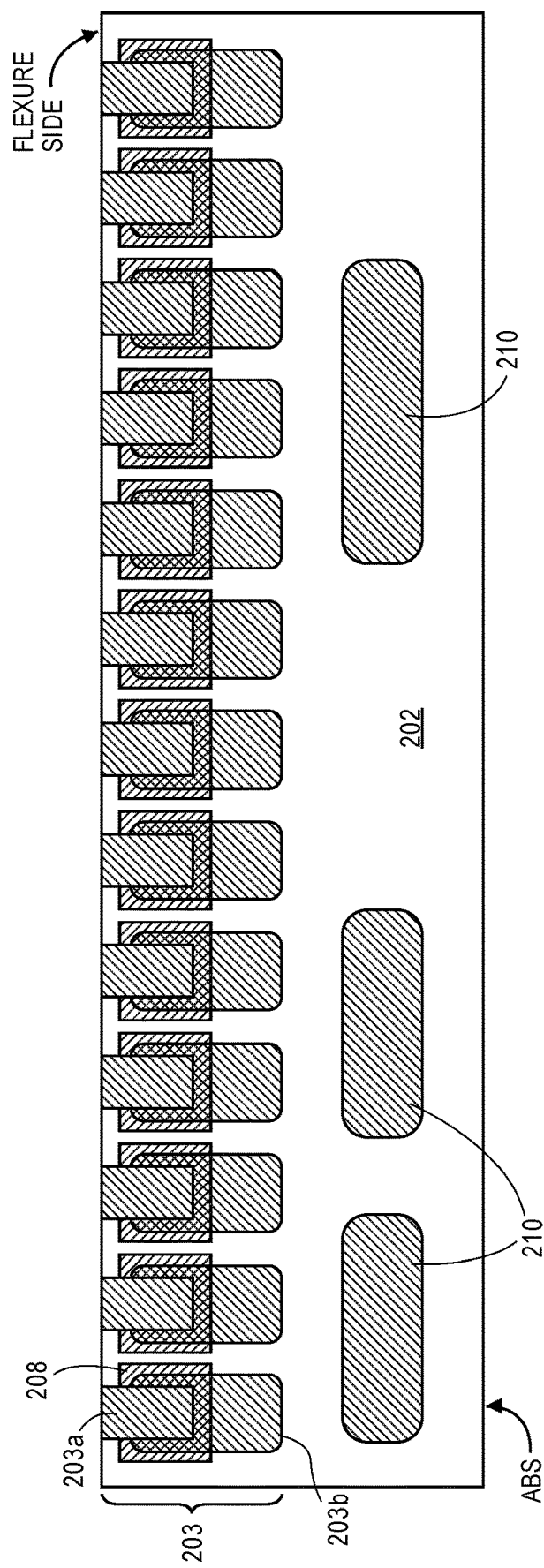
FIG. 2B is a front view illustrating a high-density pad configuration for a head slider including an anti-wetting layer, according to an embodiment.

FIG. 2B is a front view illustrating a high-density pad configuration for a head slider including an anti-wetting layer, according to an embodiment. FIG. 2B depicts an arbitrary 13-pad slider configuration, where head slider 202 comprises a plurality of slider pads 203 each configured commensurate with slider pad 203 of FIG. 2A. As mentioned elsewhere herein, from the viewpoint of the head-gimbal assembly (HGA) soldering process, the required bonding pad 203a area is only for soldering and its width can be relatively narrow and, by contrast, a wider testing pad 203b width is needed for electrical testing (e.g., row level quasi-static testing, slider DET (SDET)) for electrical probe contact during the slider fabrication process. Here also an overlaid (e.g., deposited) TiN anti-wetting layer 208 is shown (only one instance labeled here to maintain clarity) separating each pad 203 into its constituent "virtual" bonding pad 203a and "virtual" testing pad 203b. Note that the auxiliary pads 210 or circuits shown on slider 202 are typically used for other purposes disassociated from the pads 203, such as for ELG (electrical lapping guide) for measuring lapping process(es) during fabrication of the read-write head to guide and characterize the final slider and read-write device dimensions, rather than for electrical testing. Note that some testing/probing operations on the slider 202 encounter problems probing on the TiN and thus need to be probed or contacted on the portion of each testing pad 203b closer to the ABS surface (i.e., farther from the flexure side), thereby effectively limiting the useful contact area with the TiN in place.

The number of slider electrical connections and thus electrical pads is expected to increase over time due to the implementation of new technologies, such as energy-assisted magnetic recording (EAMR), including heat-assisted magnetic recording (HAMR), microwave-assisted magnetic recording (MAMR), and the like. Consequently, to make room for the additional connection pads the size of the pads are expected to decrease accordingly, which is likely to exacerbate these solder flow challenges even further, possibly resulting in increasingly more solder defects thereby worsening head gimbal assembly (HGA) yield.

Slider Split Electrical Pad Configuration

Figure 3:
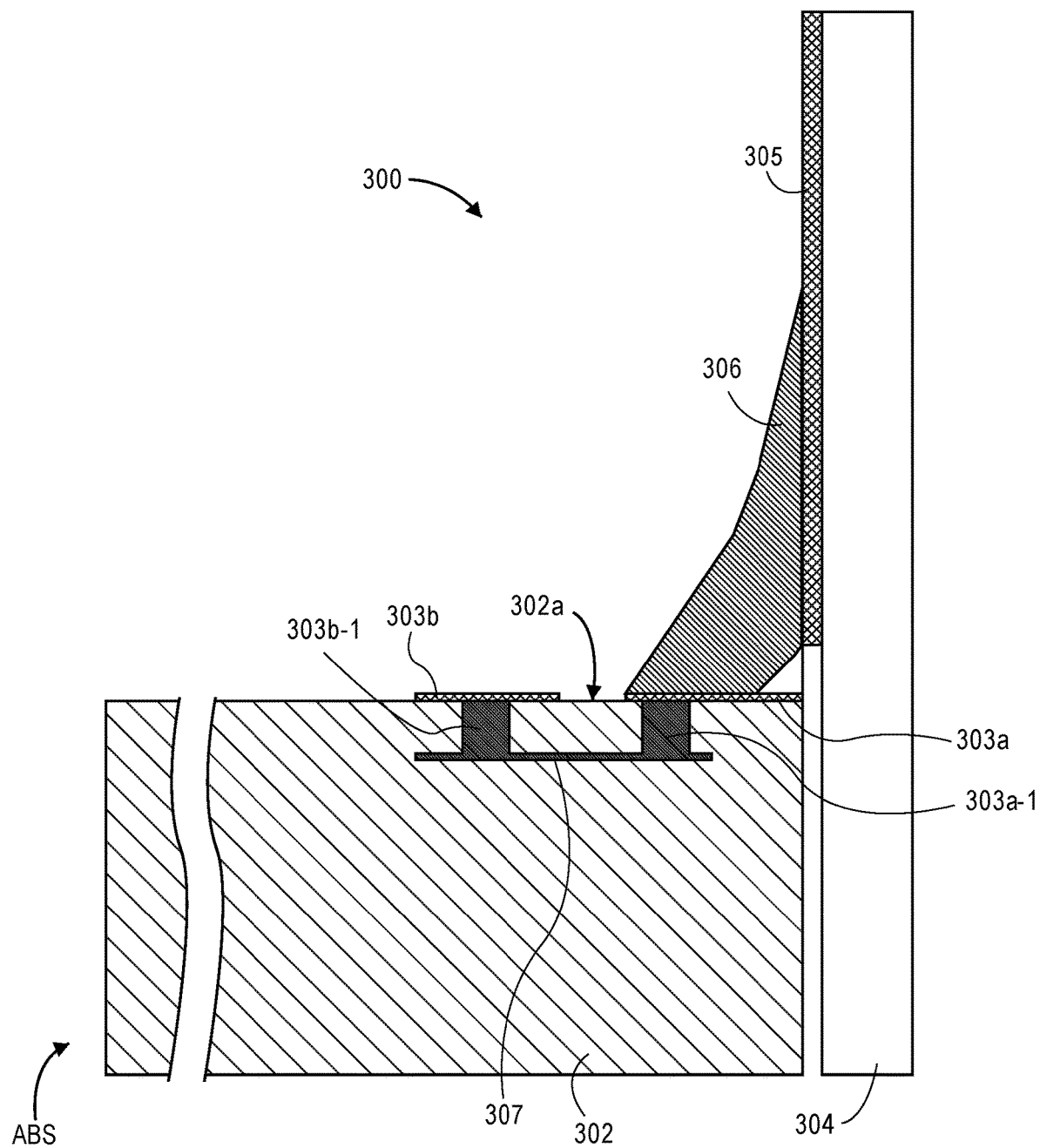
FIG. 3 is a cross-sectional side view illustrating a split pad slider-flexure electrical connection, according to an embodiment.

FIG. 3 is a cross-sectional side view illustrating a split pad slider-flexure electrical connection, according to an embodiment. Split-pad configuration 300 comprises a head slider 302 electrically connected to a flexure 304 by way of an electrical interconnection, i.e., a solder fillet 306, between a slider electrical bonding pad 303a (or simply "bonding pad") coupled with or constituent to the slider 302 and a flexure electrical pad 305 (or simply "flexure pad" or "suspension pad") coupled with or constituent to the flexure 304. Corresponding to the bonding pad 303a, slider 302 further comprises an electrically conductive (e.g., copper) stud 303a-1, extending into the body of slider 302 and electrically coupling the bonding pad 303a with a conductive layer 307 (e.g., electric circuit) recessed within the body of slider 302. Slider 302 further comprises an electrical testing pad 303b (or simply "testing pad") separate and at a distance from the bonding pad 303a, and a corresponding electrically conductive (e.g., copper) stud 303b-1 extending into the body of slider 302 and electrically coupling the testing pad 303b with the conductive layer 307. Here, a TiN anti-wetting layer is unnecessary because the flow of the solder fillet 306 material is inhibited from flowing onto or over the testing pad 303b by the slider material (e.g., alumina, or aluminum oxide, overcoat) positioned in the gap between the bonding pad 303a and the corresponding proximate testing pad 303b at an area labeled 302a. Hence, each of the bonding pad 303a and the testing pad 303b can be independently optimized. For example and according to an embodiment, one or more of the bonding pads 303a are formed at least in part narrower than corresponding testing pads 303b. Similarly and according to embodiment, one or more of the testing pads 303b are formed having a different shape than a corresponding bonding pad 303a, and one or more of the testing pads 303b are formed having a different shape than an adjacent testing pad, such that testing pads can be formed in different shapes specific to a corresponding functional purpose.

While the side view of FIG. 3 illustrates a single electrical connection and split pad configuration 300 for purposes of discussion, an implementation of a hard disk drive head slider such as slider 302 would in practice comprise a plurality of bonding pads 303a each with a corresponding respective stud 303a-1, a plurality of testing pads 303b (each proximate to and at a distance from a corresponding bonding pad 303a) each with a corresponding respective stud 303b-1, and the common conductive layer 307 electrically connecting each bonding pad 303a-testing pad 303b pair via each corresponding stud 303a-1-stud 303b-1 pair. For a non-limiting example, the split pad configuration 300 of FIG. 3 may be implemented in a 13-pad slider configuration such as with slider 202 of FIG. 2B, where a plurality of bonding pad 303a-testing pad 303b pairs and corresponding stud 303a-1-stud 303b-1 pairs are substituted for the plurality of slider pads 203 (FIG. 2B). However, the number of pad pairs and stud pairs may vary from implementation to implementation.

Figure 4B:
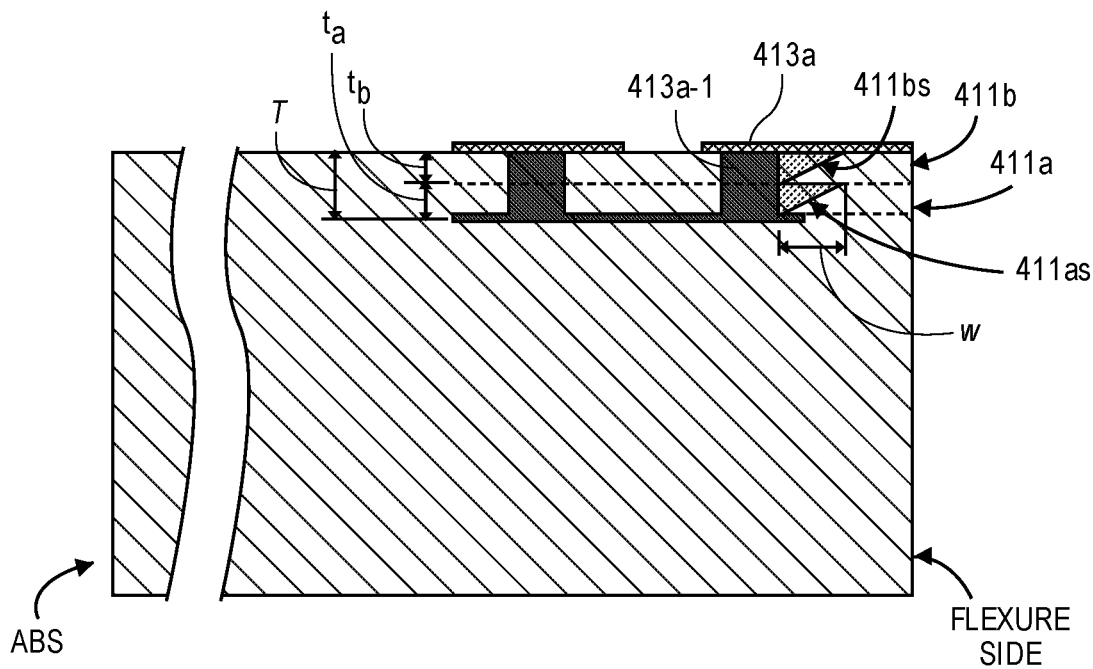
FIG. 4B is a cross-sectional side view illustrating a split pad slider having two overcoats, according to an embodiment.
Figure 4A:
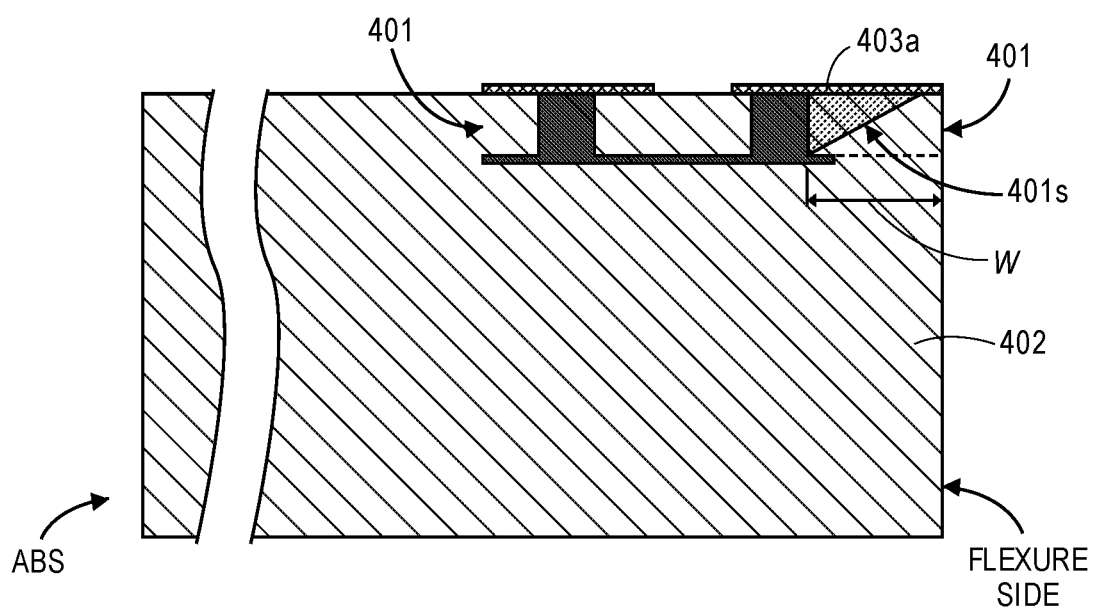
FIG. 4A is a cross-sectional side view illustrating a split pad slider having a single overcoat, according to an embodiment.

A challenge with respect to the split pad configuration 300 is that the bonding stud 303a-1 is likely to be closer to the flexure 304 side of slider 302 than for the stud 203-1 (FIG. 2A) of the slider 202 (FIG. 2A). Thus generally, when overcoat is deposited around the copper studs the alumina next to the stud has different properties and a seam grows from the base of the stud to the surface of the alumina. FIG. 4A is a cross-sectional side view illustrating a split pad slider having a single overcoat, according to an embodiment. With a single overcoat 401 of slider 402 as depicted in FIG. 4A, there could be a risk that seam 401s reaches or intersects with the flexure side after slider flexure side lapping. This could ultimately result in the seam 401s line alumina separating from the slider 402, leaving a void and damaging the (e.g., gold) bonding pad 403a. In that case the slider 402 would need to be scrapped.

However, a process for manufacturing the studs may use multiple overcoat deposition and lapping steps. FIG. 4B is a cross-sectional side view illustrating a split pad slider having two overcoats, according to an embodiment. In this case, the thickness $t_a$, $t_b$ of each of two respective overcoats 411a, 411b could be targeted at half of the total overcoat thickness T. This would reduce the width w of each of the seam 411as, 411bs lines by approximately half (w=½W) and likely enable the bonding stud 413a-1 corresponding to bonding pad 413a to be constructed without the seam 411as, 411bs lines extending to the slider edge at the flexure side, as depicted in FIG. 4B. Thus, according to an embodiment, slider 412 (and slider 302 of FIG. 3) further comprises a first overcoat 411a fill around at least a first portion of each of the plurality of bonding studs 413a-1 (and 303a-1) and a second separate overcoat 411b fill around at least a second portion of each of the plurality of bonding studs 413a-1 (and 303a-1).

Method for Manufacturing Hard Disk Drive Head Slider

Figure 5:
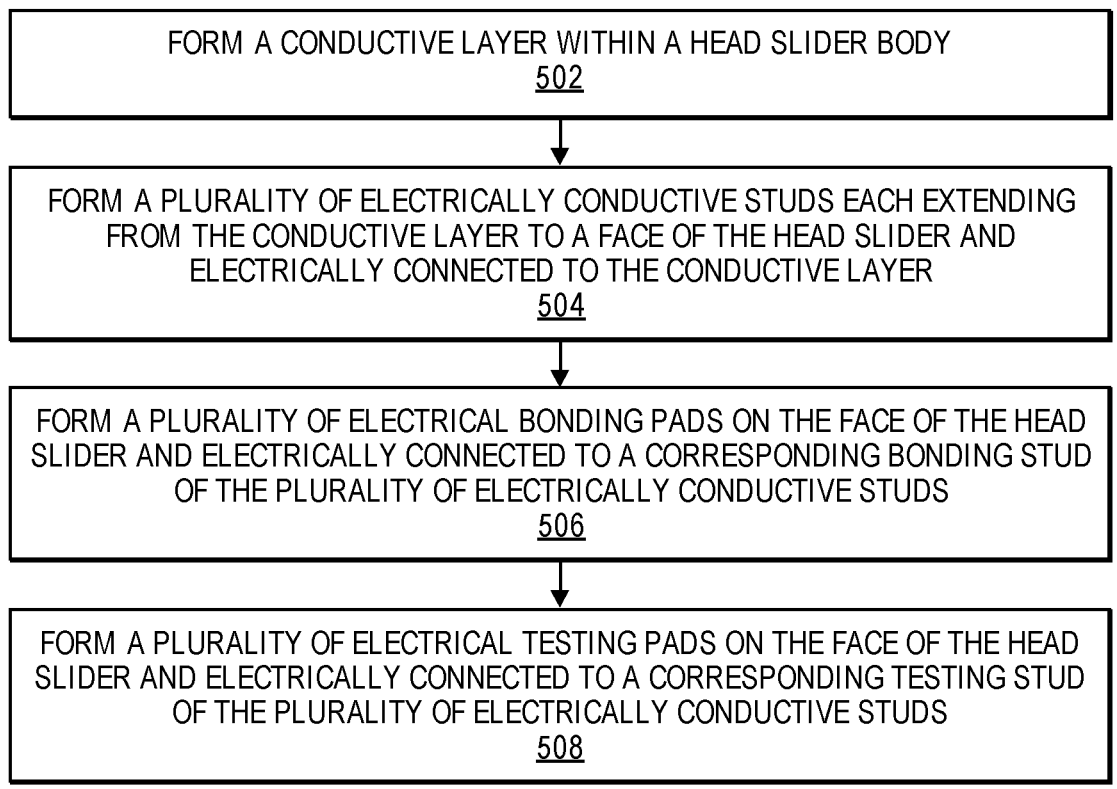
FIG. 5 is a flowchart illustrating a method for manufacturing a hard disk drive head slider, according to an embodiment.

FIG. 5 is a flowchart illustrating a method for manufacturing a hard disk drive head slider, according to an embodiment. More particularly, the following method blocks apply to a method for forming a plurality of electrical connection pad circuits for a hard disk drive head slider.

At block 502, form a conductive layer within a head slider body. For example, conductive layer 307 (FIG. 3) is formed on a head slider 302 (FIG. 3), according to known slider manufacturing techniques. For example, the conductive layer 307 may be deposited or otherwise formed in conjunction with a coil 2 wiring layer of the slider 302.

At block 504, form a plurality of electrically conductive studs each extending from the conductive layer to a face of the head slider and electrically connected to the conductive layer. For example, a number of studs 303a-1 (FIG. 3) and studs 303b-1 (FIG. 3) are formed or constructed to extend from the conductive layer 307 to the bonding face of the slider 302, i.e., the face of slider 302 on which the pads 303a, 303b (FIG. 3) are positioned, according to known slider manufacturing techniques.

According to an embodiment, forming the electrically conductive studs at block 504 includes forming a first portion of a bonding stud 413a-1 (FIG. 4B), then forming a first overcoat 411a (FIG. 4B) fill around at least a portion of the first portion of the bonding stud 413a-1, forming a second portion of the bonding stud 413a-1 in electrical contact with the first portion, and then forming a second overcoat fill 411b (FIG. 4B) around at least a portion of the second portion of the bonding stud 413a-1. As described elsewhere herein, such an approach enables the bonding stud 413a-1 corresponding to bonding pad 413a to be constructed without the overcoat fill seam 411as, 411bs lines (FIG. 4B) extending to or relatively near to (e.g., within a margin that may be affected by subsequent lapping process) the flexure side face of the slider 412 (FIG. 4B).

At block 506, form a plurality of electrical bonding pads on the face of the head slider and electrically connected to a corresponding bonding stud of the plurality of electrically conductive studs. For example, a number of bonding pads 303a are formed or constructed on the face of the slider 302 and electrically connected or coupled with a corresponding bonding stud 303a-1, according to known slider manufacturing techniques. Stated otherwise, each bonding stud 303a-1 formed at block 504 is coupled with a corresponding bonding pad 303a at block 506.

At block 508, form a plurality of electrical testing pads on the face of the head slider and electrically connected to a corresponding testing stud of the plurality of electrically conductive studs. For example, a number of testing pads 303b are formed or constructed on the face of the slider 302, at a certain distance from an adjacent, proximate corresponding bonding pad 303a with an exposed gap area 302a (FIG. 3) (e.g., of alumina overcoat) therebetween, and electrically connected or coupled with a corresponding testing stud 303b-1, according to known slider manufacturing techniques. Stated otherwise, each testing stud 303b-1 formed at block 504 is coupled with a corresponding testing pad 303b at block 508. Note that in practice, blocks 506 and 508 are not necessarily independent manufacturing steps performed separately, as the bonding pads and the testing pads may possibly be and are likely to be formed concurrently, or at least as part of the same series of pad forming manufacturing procedures (e.g., utilizing the same common mask and deposition operation for both types of pads).

Use of a described split pad arrangement accomplishes the effects of the TiN or other anti-wetting layer without the added cost, capital expenditure, process and yield difficulties. Foregoing the TiN or other anti-wetting layer should also reduce the number of pad defects created in the slider fabrication process. Furthermore, such arrangement enables high HGA (head gimbal assembly) solder bond yields, along with high probing yields at wafer final test, row quasi-static testing, and slider DET. For example, such arrangement enables 4-point probing (2 per pad) at the wafer final probing operation, enabling high accuracy measurements. These high accuracy measurements enable identification of defects which can be mapped before wafer ship, and ensure faster feedback so that wafer process problems can be fixed quickly.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or "Motor Base Assembly" (MBA) or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A head slider housing a read-write transducer, the head slider comprising:
    a plurality of bonding electrical pads;
    a plurality of electrically conductive bonding studs each extending into a head slider body from a corresponding bonding electrical pad;
    a plurality of testing electrical pads each positioned proximate to and at a distance from a corresponding bonding electrical pad;
    a plurality of electrically conductive testing studs each extending into the head slider body from a corresponding testing electrical pad; and
    a conductive layer within the head slider body and electrically connecting a bonding electrical pad of the plurality of bonding electrical pads with a corresponding testing electrical pad of the plurality of testing electrical pads via a respective bonding stud of the plurality of bonding studs and a respective testing stud of the plurality of testing studs.

2. The head slider of claim 1, wherein a gap corresponding to the distance between each testing electrical pad and corresponding bonding electrical pad comprises a material of which the head slider body is composed.

3. The head slider of claim 1, wherein each bonding electrical pad is at least in part narrower than each corresponding testing electrical pad.

4. The head slider of claim 1, further comprising:
    a first overcoat fill around at least a first portion of each of the plurality of bonding studs; and
    a second separate overcoat fill around at least a second portion, in electrical contact with the first portion, of each of the plurality of bonding studs.

5. The head slider of claim 1, wherein no portion of the bonding electrical pads and the testing electrical pads are covered with an anti-wetting material layer.

6. A hard disk drive comprising the head slider of claim 1.

7. A method for manufacturing a hard disk drive head slider, the method comprising:
    forming a conductive layer within a head slider body;
    forming a plurality of electrically conductive studs each extending from the conductive layer to a face of the head slider and electrically connected to the conductive layer;
    forming a plurality of electrical bonding pads on the face of the head slider and electrically connected to a corresponding bonding stud of the plurality of electrically conductive studs; and
    forming a plurality of electrical testing pads on the face of the head slider and electrically connected to a corresponding testing stud of the plurality of electrically conductive studs.

8. The method of claim 7, wherein forming the plurality of bonding pads and forming the plurality of testing pads includes forming a gap, between each bonding pad and a corresponding proximate testing pad, comprising a material of which a body of the head slider is composed.

9. The method of claim 7, wherein forming the plurality of bonding pads and forming the plurality of testing pads includes forming a bonding pad at least in part narrower than a corresponding proximate testing pad.

10. The method of claim 7, wherein forming the plurality of bonding pads and forming the plurality of testing pads includes forming a bonding pad having a shape different from a corresponding proximate testing pad.

11. The method of claim 7, wherein forming the plurality of studs includes, for at least one bonding stud:
forming a first portion of the bonding stud;
forming a first overcoat fill around at least a portion of the first portion of the bonding stud;
forming a second portion of the bonding stud substantially in electrical contact with the first portion; and;
forming a second overcoat fill around at least a portion of the second portion of the bonding stud.

12. The method of claim 11, wherein:
the face of the head slider is an electrical pad face; and
forming the first overcoat fill and forming the second overcoat fill include forming the first and second overcoat fills so that neither overcoat fill extends to a certain distance from a flexure face of the head slider substantially normal to the electrical pad face.

13. The method of claim 7, excluding forming an anti-wetting layer over a portion of the bonding pads or the testing pads.

14. A hard disk drive comprising a head slider produced according to the method of claim 7.

15. A hard disk drive (HDD) comprising:
a plurality of recording media rotatably mounted on a spindle;
a plurality of head sliders each housing a respective read-write transducer configured to read from and to write to at least one recording media of the plurality of recording media;
means for moving the plurality of head sliders to access portions of the at least one recording media;
means for transmitting electrical signals to and from a respective head slider of the plurality of head sliders; and
wherein each head slider comprises:
a plurality of bonding electrical pads,
a plurality of electrically conductive bonding studs each extending into a head slider body from a corresponding bonding electrical pad,
a plurality of testing electrical pads each positioned proximate to and at a distance from a corresponding bonding electrical pad,
a plurality of electrically conductive testing studs each extending into the head slider body from a corresponding testing electrical pad, and
a conductive layer within the head slider body and electrically connecting a bonding electrical pad of the plurality of bonding electrical pads with a corresponding testing electrical pad of the plurality of testing electrical pads.

16. The HDD of claim 15, wherein a gap corresponding to the distance between each testing electrical pad and corresponding bonding electrical pad comprises a material of which the head slider body is composed.

17. The HDD of claim 15, wherein each bonding electrical pad is at least in part narrower than each corresponding testing electrical pad.

18. The HDD of claim 15, wherein at least one bonding pad has a shape different from a corresponding proximate testing pad.

19. The HDD of claim 15, wherein at least one testing pad has a shape different from an adjacent testing pad.

20. The HDD of claim 15, wherein each of the plurality of electrically conductive bonding studs comprises a first portion and an electrically-connected second portion, the head slider further comprising:
a first overcoat fill around at least a portion of the first portion and extending to a certain distance from a face of the head slider that is substantially parallel to the direction that the first portion extends; and
a second separate overcoat fill around at least a portion of the second portion and extending to a certain distance from the face of the head slider.

* * * * *